Nov. 1, 1960  W. A. ANDERSON ET AL  2,958,827
ELECTRICAL CANCELLATION AND INDICATING SYSTEM
Filed Sept. 2, 1943  6 Sheets-Sheet 1
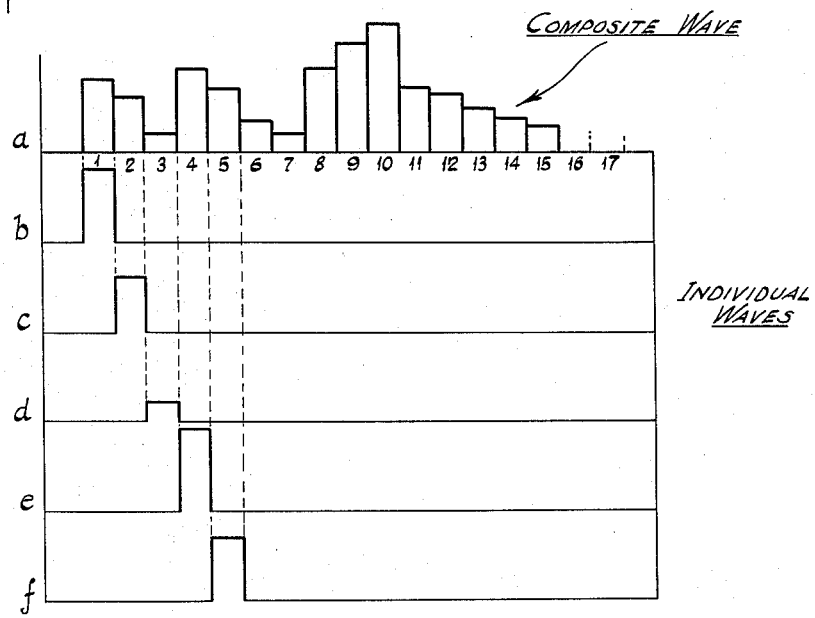
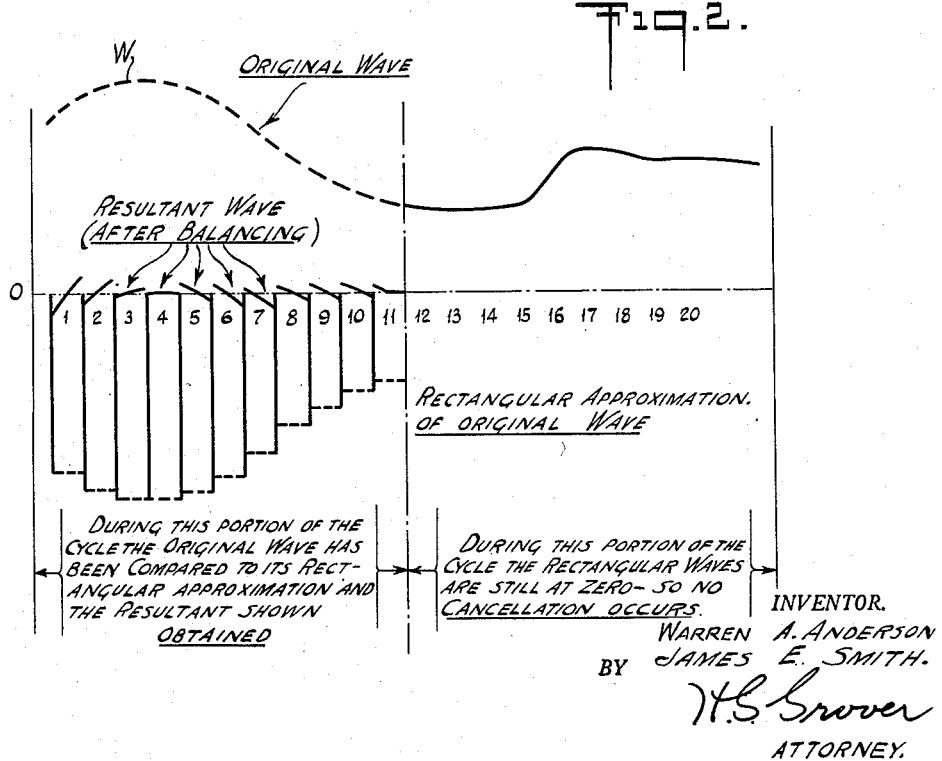
INVENTOR.
WARREN A. ANDERSON
JAMES E. SMITH.
BY
ATTORNEY.

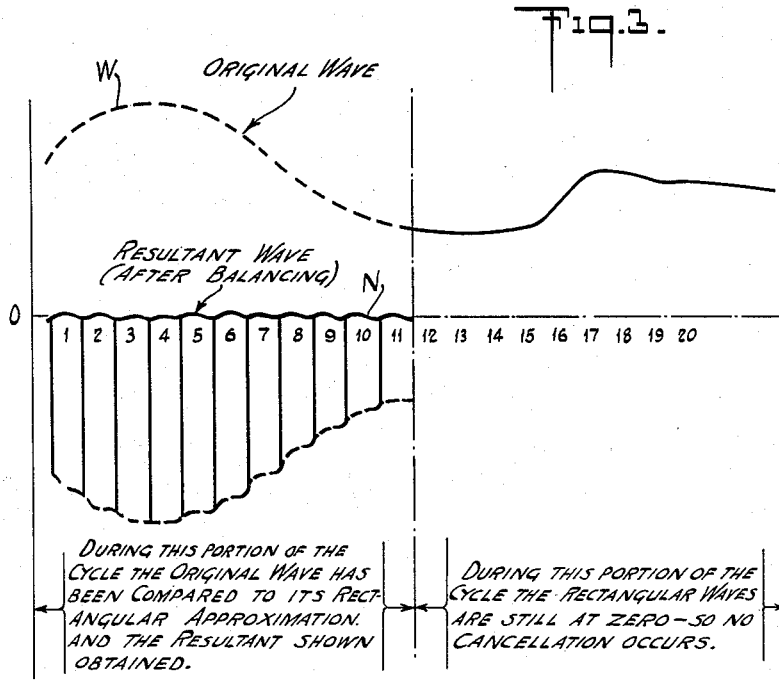
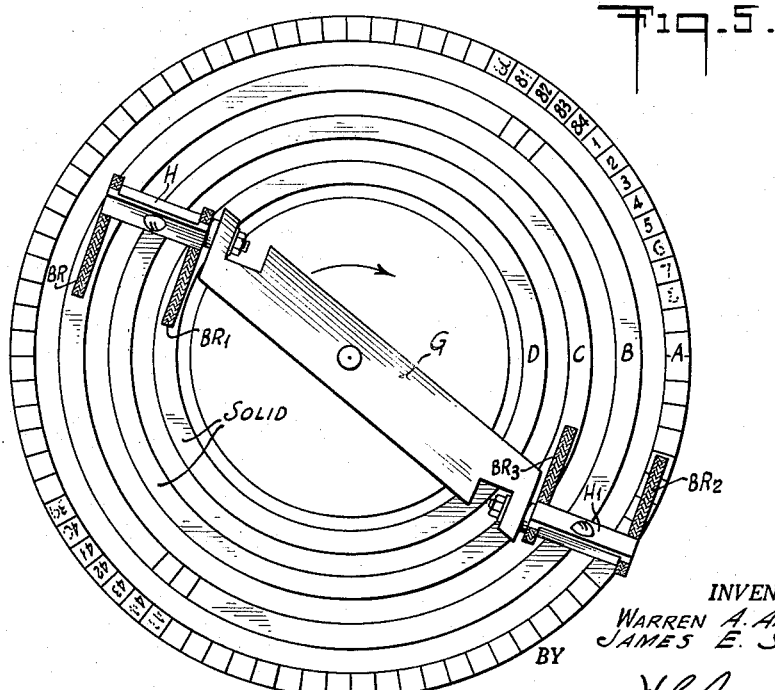

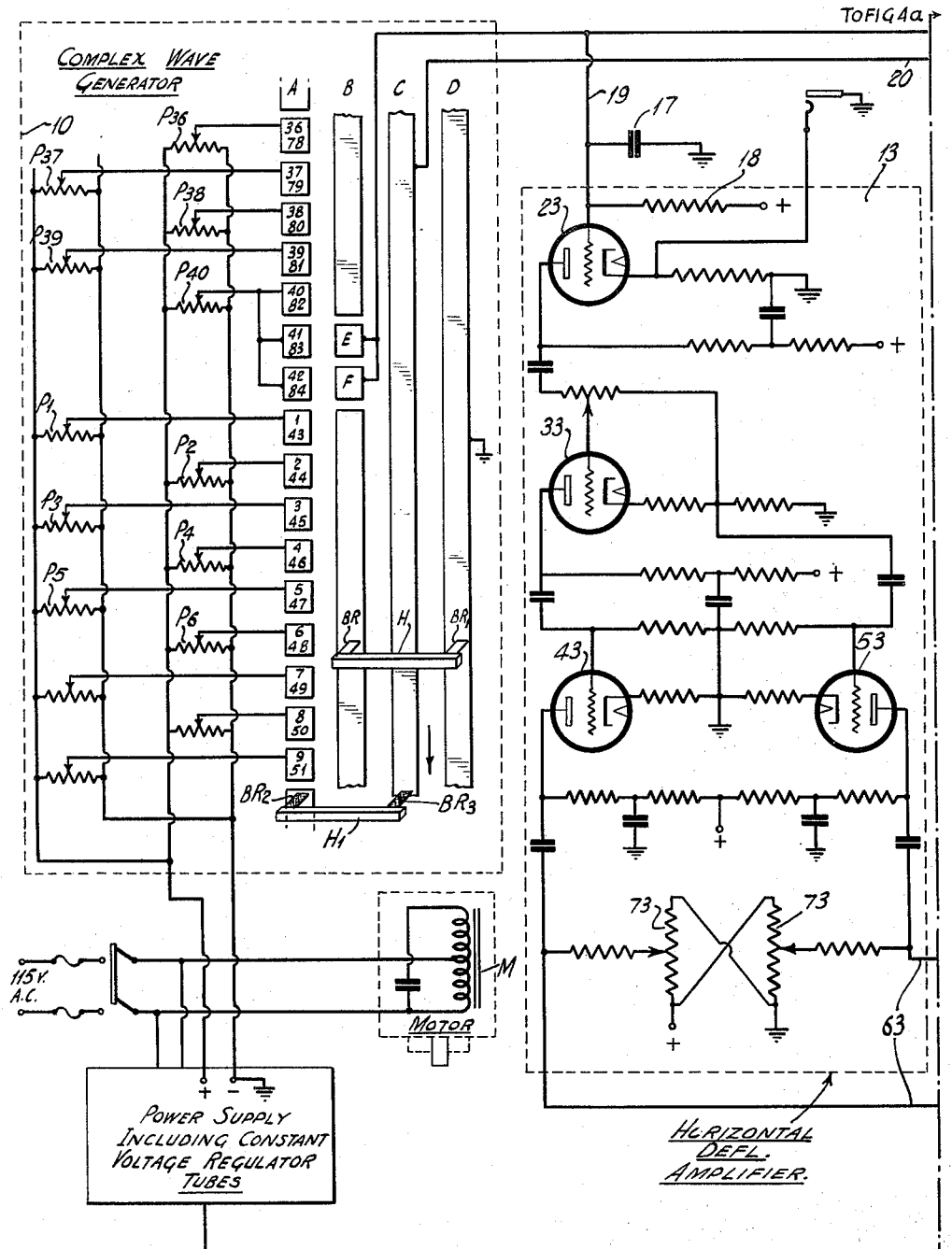

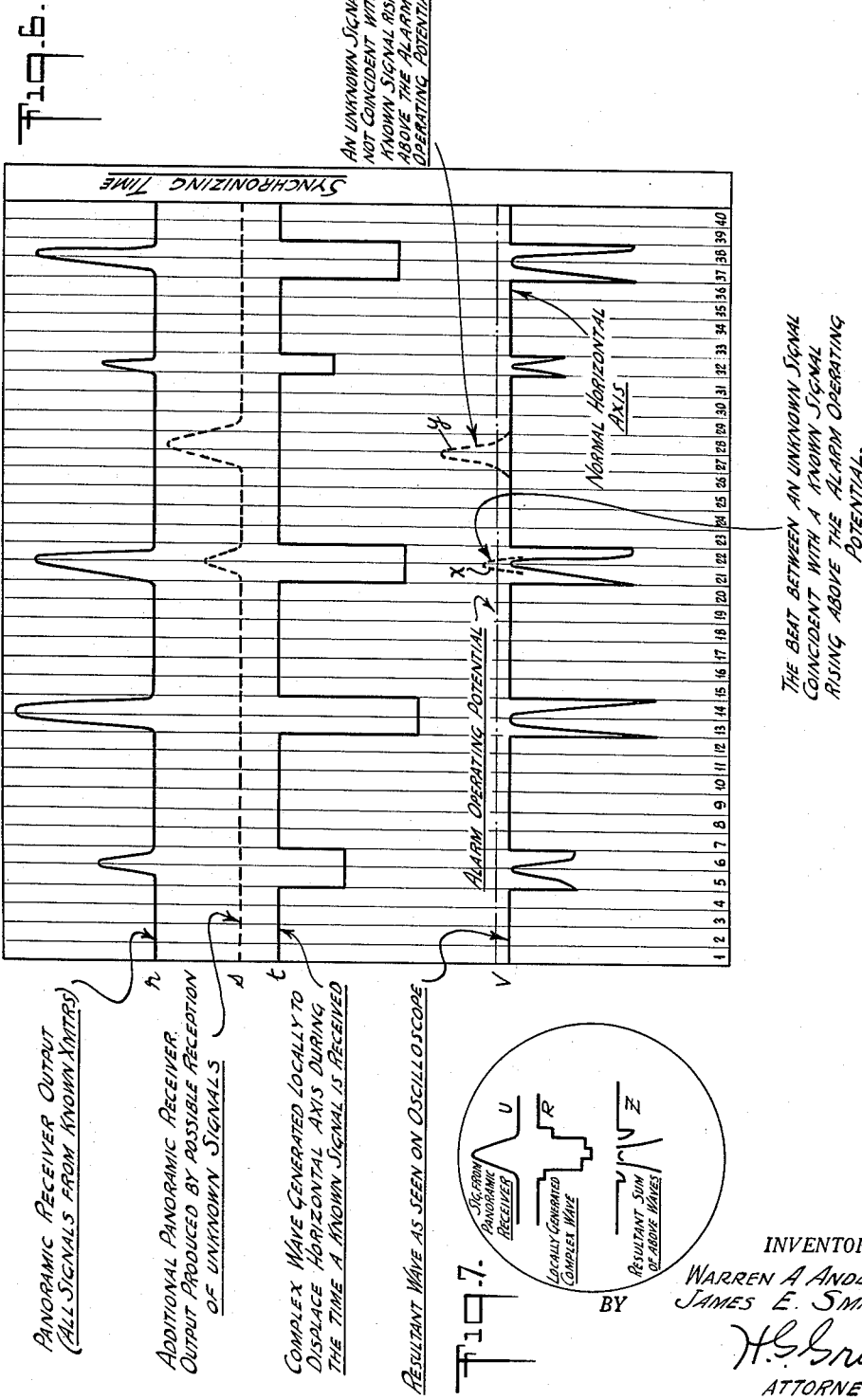

Nov. 1, 1960

W. A. ANDERSON ET AL 2,958,827

ELECTRICAL CANCELLATION AND INDICATING SYSTEM

Filed Sept. 2, 1943

INVENTOR
WARREN A. ANDERSON.
JAMES E. SMITH.
BY
H.S. Grover
ATTORNEY

United States Patent Office 2,958,827
Patented Nov. 1, 1960

2,958,827

ELECTRICAL CANCELLATION AND INDICATING SYSTEM

Warren A. Anderson, West Brighton, and James E. Smith, Jackson Heights, N.Y., assignors, by mesne assignments, to the United States of America as represented by the Secretary of the Army Filed Sept. 2, 1943, Ser. No. 500,926

7 Claims. (Cl. 328—165)

The present invention comprises a system which will cancel out any recurrent complex wave and give an alarm indication when new wave components appear. As an illustration, let us suppose it is desired to monitor the received wave of an underwater detection system or to investigate the received waves appearing in a portion of the radio frequency spectrum. Each of these received waves may be composed of a known transmitted signal and the fixed reflections occurring therefrom. In accordance with the invention, means are provided for cancelling out these received waves and for establishing an alarm threshold in such manner that the appearance of any new reflected or transmitted signal will operate the alarm.

The basic system of the invention incorporates a scheme to produce a neutralizing wave, an arrangement for using this wave to cancel or balance out fixed signals, an oscilloscope to observe the adjustments, and an alarm device to call attention to any change in the signal.

An important feature of the invention comprises the wave generator for producing an adjustable complex voltage wave form (i.e., the neutralizing wave) which can be made very nearly identical to any known repetitive wave that may be produced by an unknown source. Another important feature lies in the use of the electronic mixer or comparator circuit having linear input-output characteristics and which automatically compares the known, locally produced wave, and the unknown wave in such manner that their resultant is zero or substantially so, until a change occurs in the shape of the unknown wave. A further feature of the invention is the aural or visual alarm which indicates any change in the unknown wave regardless of the polarity of this change.

A detailed description of the invention will now be given with particular reference to its use in connection with a radio receiver for monitoring a portion of the radio spectrum. Such receivers are customarily designed to be tuned rapidly and periodically over a given band of frequencies (a procedure sometimes referred to as scanning) by means of a sweep device in order to monitor the radio spectrum for enemy or illegal stations. It should be understood, however, that the present invention has various possible uses, and that its application to a scanning receiver is merely illustrative.

In the accompanying drawing:

Fig. 1 graphically illustrates a series of individual rectangular waves as produced by the local wave generator, the sum of which duplicates a particular wave form to a certain approximation;

Fig. 2 graphically illustrates how the locally produced wave form can be made to duplicate and cancel out a received or unknown wave;

Fig. 3 illustrates the graphical representation of Fig. 2 when means are provided for reducing the residual noise shown in Fig. 2;

Figs. 4 and 4a, taken together, illustrate the complete system of the invention used in association with a monitoring receiver for scanning a portion of the radio frequency spectrum;

Fig. 5 illustrates the face plate of the local wave generator which produces a series of repetitive and sequentially appearing rectangular waves of equal duration but of adjustable amplitudes;

Fig. 6 illustrates different wave forms which may appear on the oscilloscope of Fig. 5 in the process of monitoring a plurality of transmitting stations in a portion of the radio frequency spectrum;

Fig. 7 illustrates the wave forms which might appear on the oscilloscope screen when employing a step-by-step approximation to balance out an unknown received wave.

Figure 4A:
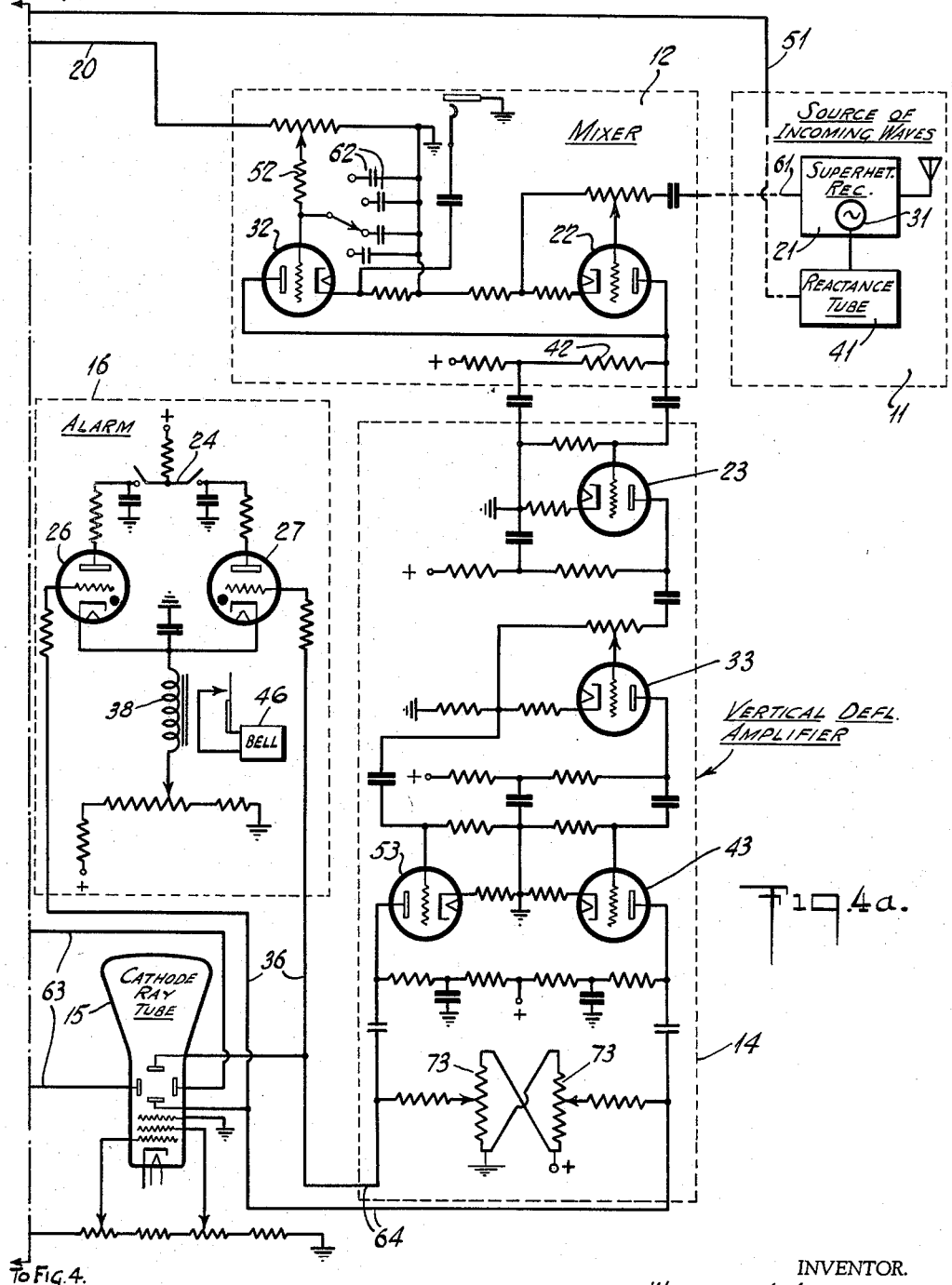

Referring to Fig. 1 in more detail, line $a$ illustrates a series of rectangular wave pulses 1 to 15, etc. of equal length or time duration but so phased or time shifted that the start time of each pulse coincides with the stop time or back end of a preceding pulse. The amplitudes of the individual pulses have been adjusted so that the entire series illustrated in line $a$ (the sum of the individual pulses shown in graphs $b$, $c$, $d$, $e$ . . .) can give a step-by-step approximation of any complex wave of the proper fundamental period. The rectangular pulses illustrated in line $a$ are merely illustrative of any desired number of such pulses which can be produced by the local wave generator of the invention and which have fixed durations and fixed phase displacements but have adjustable amplitudes. The individual rectangular wave pulses numbered 1 to 5 of Fig. 1 are illustrated separately in lines $b$ to $f$, inclusive. The adjustment of the amplitude of each pulse is independent of the other adjustments and need be set only once in order to be repeated periodically. The manner in which these pulses can be individually adjusted to cancel or balance out (neutralize) its particular small portion of the total cycle of an unknown wave is described in more detail later.

Fig. 2 illustrates graphically how the rectangular wave pulses produced by the local wave generator of the invention can duplicate a wave form and balance out any desired portion of an unknown wave. The unknown wave is labeled W. The portion of wave W to the left of the dot and dash vertical center line is shown in dash lines and represents that portion which has been cancelled or balanced out by the first eleven locally produced rectangular waves. The portion of wave W to the right of the center line is shown in solid lines and has not been cancelled or balanced out. The first eleven rectangular wave pulses, labeled 1 to 11, form a step-by-step approximation or duplication of that portion of wave W to be neutralized, and the polarity of these local pulses are shown inverted relative to the polarity of the wave to be balanced out. The short lines which cross the horizontal axis of Fig. 2 at positions corresponding to the locations of the first eleven rectangular pulses represent triangular residual or noise produced by this particular method of balancing an unknown wave by a locally produced or synthesized wave.

This residual or noise shown in Fig. 2 can be considerably reduced by shunting the locally produced or synthesized electrical wave (formed by the series of rectangular pulses) by means of a capacitance, as described more in detail later. The improvement is graphically illustrated in Fig. 3 which shows how the corners of the rectangular wave pulses of the locally produced wave have been rounded to approximate the shape of the unknown wave W to a higher degree. It should be noted that the resultant wave N, after balancing, is almost a straight line as compared to the short discontinuous lines of Fig. 2.

Figs. 4 and 4a, taken together, illustrate the system of the invention in detail, as applied to a scanning receiver. The system of Figs. 4 and 4a shows the essential elements of one particular application of the invention as consisting of a complex wave generator 10 for producing the series of rectangular wave pulses of fixed durations and fixed phase displacements but of variable amplitudes; a source of unknown waves here shown as a scanning receiver 11; a comparator or mixer circuit 12 for mixing the locally produced wave form from generator 10 with the unknown wave and for producing an output which is proportional to the sum of the two waves, a horizontal deflection amplifier 13, a vertical deflection amplifier 14, an oscilloscope in the form of a cathode ray device 15, and an alarm circuit 16.

The unknown wave or waves to be cancelled out by the locally produced wave form emanate from the receiver system 11 which consists of a superheterodyne receiver 21 indicated diagrammatically in box form. The heterodyne oscillator for the superheterodyne receiver is represented by 31. This oscillator has its frequency continually and periodically changed over a desired band width by means of a reactance tube circuit 41 which causes the receiver to periodically scan a predetermined portion of the radio frequency spectrum. The control grid of the reactance tube is connected by means of lead 51 to the output of a sweep device or saw-tooth generator. This sweep device or saw-tooth generator, described in more detail hereinafter, supplies saw-tooth waves of audio frequency, let us say 30 saw-tooth waves per second. The reactance tube 41 is well known in the frequency modulation art for providing a variable reactance output dependent upon the modulating voltages applied to the grid of the device. The scanning receiver system 11 may be of a type described and illustrated in detail in Bliss copending applications Serial Nos. 459,504 and 461,526, filed September 24, 1942 and October 10, 1942, respectively, now U.S. Patents 2,409,012 and 2,442,583, to which reference is herein made. This receiver will scan a given frequency band of the radio spectrum and is designed to provide audio frequency pulses to lead 61 extending to the mixer circuit 12.

The complex wave generator 10 for producing the local or known wave to cancel or balance out the received wave incoming over lead 61 comprises a commutator assembly having four concentric rings A, B, C and D. The front view of this face plate, together with the brush assembly, is shown in Fig. 5. Ring A is the outside ring and is divided into eighty-four equal length but closely spaced segments which are insulated from one another. Diametrically opposite segments of ring A are connected together. Thus, segments 1 and 43 are directly connected together; 2 and 44 connected together; 3 and 45 connected together, etc., as shown more clearly in Fig. 4 wherein only several segments are shown of the ring A, each of which bears the two numbers of the two segments which are directly connected together. Considering any two diametrically opposite segments as one unit, there are provided forty different potentiometers P1 to P40 for the forty different units. These potentiometers all have their respective high impedance terminals connected in parallel. The remaining two units illustrated in Fig. 4 as the four segments 41, 83 and 42, 84 are not used, and the time during which the brush crosses these segments has been assigned to synchronizing purposes.

Ring B of the commutator comprises a solid ring except for the two separated segments E and F which are on the same radial lines connecting the center of the commutator with unit segments 41, 83 and 42, 84. Rings C and D are completely solid. Ring D is connected to ground, as shown. A pair of brushes BR and BR1 rest on rings B and D, respectively, and are connected together by metallic brush holder H. Another pair of brushes BR2 and BR3 rest on rings A and C, respectively and are connected together by metallic brush holder H1. The two pairs of brushes are located 180° apart; that is, diametrically opposite to one another on the commutator, as shown more clearly in Fig. 5, and driven by means of a common insulating arm G. Both pairs of brushes are driven simultaneously to rotate in the direction of the arrows shown in Figs. 4 and 5, by means of motor M. The angular velocity of the rotating brush arms in the system of Fig. 4 is approximately 15 cycles per second, and this fundamental frequency is doubled for the same angular velocity because of the use of two diametrically opposite segments tied together in parallel for each unit. It will be evident from what has gone before, that the complex wave generator could be used with only a 42 segment face plate for ring A (one-half the number of segments actually employed), but in such case the angular speed could not be increased materially without causing noticeable splits between the rectangular pulses unless great care is taken in the adjustment of the brush position. By doubling the number of segments to 84 and tying diametrically opposite segments in parallel, it is possible to repeat the local wave twice for each rotation of the brush and double the fundamental frequency for the same angular velocity. In the same way, the frequency can be tripled with three times the number of 42 segments etc. The segments 41, 42, 83 and 84 are connected to segment 40. During the time that the brush BR2 is passing over these segments, the brush BR makes contact with the isolated segments E and F shown on ring B. Segments E and F form part of a saw-tooth generator to be described later.

Thus, the complex wave output of the generator 10 is made up of forty successive equal duration and closely adjacent rectangular pulses and has the fundamental frequency of 30 cycles per second even though the brushes actually rotate at 15 cycles per second. The angular speed of the brushes is derived from synchronous motor M operating at 1800 rotations per minute through a 2:1 step-down gear train. The amplitude or voltage of each of the forty successive rectangular pulses is individually adjusted by means of the tap on the particular potentiometer associated with the segment from which the pulse is derived. Thus, by setting the potentiometers P1 to P40 on different points, it is possible to provide different voltages on the segments, and derive a wave form which closely approximates or simulates any desired unknown wave. The unknown wave to be simulated appears on the oscilloscope as will appear later in the description.

The saw-tooth generator or sweep device for producing recurring saw-tooth waves comprises a condenser 17 upon which a charge builds up linearly from the positive (+) terminal of a source of unidirectional potential through resistor 18. Condenser 17, it should be noted, has one of its plates connected to ground and its other plate connected by means of lead 19 to the segments E and F of ring B. Lead 19 is also connected to lead 51 extending to the reactance tube 41 of the scanning receiver 11. When brush BR contacts segments E and F on its travel around the commutator, there is provided a path to ground through brushes BR, BR1 and ring D which discharges the condenser 17. It will thus be seen that the wave form of the voltage wave appearing across condenser 17 has a saw-tooth shape, and that this saw-tooth wave periodically recurs at the rate of thirty times per second. This saw-tooth voltage is the input voltage for both the horizontal deflection amplifier 13 and the reactance tube 41. It should be noted that the condenser 17 is prevented from recharging until the start of the first rectangular pulse comprising part of the output of the local generator 10. This is necessary since, if the condenser were permitted to recharge immediately, a part of the synchronizing time would appear on the oscilloscope screen.

The mixer stage 12 comprises a pair of class A operating triode vacuum tubes 22 and 32, the former having impressed thereon the unknown or incoming wave from lead 61 while the latter has impressed thereon the locally produced wave from lead 20 extending to the complex wave generator. Lead 20 is connected at one end to ring C of generator 10 and obtains its rectangular wave pulses through brushes BR3 and BR2 which are bridged together or shorted by arm H1. In effect, the mixer circuit 12 is a sort of comparator which adds the two voltages from the local or known wave and the unknown or incoming wave (appearing on leads 20 and 61) algebraically, and provides an output to the vertical deflection amplifier 14 which is the sum of the two voltages. Inasmuch as the components of the locally generated wave appearing on lead 20 are made to be of opposite polarity or phase with respect to the correspondingly located components of the unknown wave appearing on lead 61, the output from the mixer will be the difference voltage between the two.

The output from both triodes 22 and 32 of the mixer appears across the common anode resistor 42 through which the common anode current flows. In the operation of the mixer for the purposes of the invention, the flow of current through tube 32 is made to vary in such manner that the value of the IR drop across resistor 42 remains a constant as the current in tube 22 changes. This is done by adjusting the voltages of the successively appearing rectangular pulses in lead 20 by means of the different potentiometers P1 to P40 such that each pulse neutralizes or cancels out a correspondingly appearing voltage component in the unknown wave appearing on lead 61. Resistor 52 and condensers 62 comprise a low pass filter to reduce the high frequency content in the locally generated wave impressed on the grid of tube 32. By judiciously selecting the proper condenser 62 by means of the switch shown, we are able to reduce the triangular residual or noise shown graphically in Fig. 2 to that shown by N in Fig. 3.

The horizontal and vertical deflection amplifiers 13 and 14 respectively are substantially identical except for differences in resistance values. The output from the horizontal deflection amplifier is impressed on the horizontal deflection plates of the oscilloscope 15 through leads 63, while the output from the vertical deflection amplifier is impressed on the vertical deflection plates of the oscilloscope through leads 64. Each deflection amplifier includes three stages, namely, a first vacuum tube stage 23 followed by a coupling vacuum tube stage 33 serving to reverse the phase or polarity of the wave impressed on the first tube. Two outputs which are 180° phase displaced but of equal amplitude are derived from the circuit of coupling tubes 33 and supplied to a third stage comprising a pair of push-pull connected vacuum tube amplifiers 43, 53. The output from the vacuum tubes 43, 53 of each deflection amplifier is supplied to one pair of oppositely disposed deflection plates.

Each deflection amplifier also includes a centering circuit composed of a pair of resistors or potentiometers 73 having adjustable taps connected to the leads 63 and 64 in circuit with the deflection plates of the oscilloscope.

The oscilloscope 15 comprises a cathode ray device having a cathode, a multiplicity of grids, a voltage divider circuit for supplying suitable voltages to the grids, horizontal and vertical beam deflection plates and a screen. The grids of the oscilloscope control the brightness and the focus of the cathode ray spot on the screen. The horizontal deflection plates have impressed thereon the amplified sweep or saw-tooth voltage appearing on leads 63. The vertical deflection plates have impressed thereon the amplified output from the mixer circuit 12.

The alarm system 16 comprises two gaseous grid-controlled tubes 26 and 27 (thyratrons) whose grids are connected through suitable resistors and leads 36 directly to the vertical deflection plates. The anodes are supplied with a positive polarizing potential through switch 24 in its closed position. The cathodes of these tubes are connected together and raised above the centering potential derived from resistors 73, so that the grids of the gas tubes are normally at a negative potential relative to the cathodes during the time the incoming or unknown wave is neutralized by the locally generated wave. In the common cathode circuit of the two gas tubes, there is placed the coil winding of an electromagnetic relay 38 whose contacts are connected to an audible alarm, such as a bell 46. If desired, there may also be connected to these contacts a visual indicator circuit, such as a light. From the circuit arrangement so far described, it will be evident that one of the vertical deflection plates must go positive for either an upward or a downward motion of the oscilloscope trace. Consequently, in view of the direct coupling between the grids of the gas tubes to the vertical deflection plates of the oscilloscope, one gas tube is biased to ignite on an upward deflection of the oscilloscope electron beam and the other on a downward deflection of the electron beam. This occurs as soon as the incoming or unknown wave departs above the locally generated wave to give a desired difference in output from the mixer circuit, in which event one or the other of the push-pull connected vacuum tubes 43, 53 in the vertical deflection amplifier will supply a positive voltage to the grid of one of the gas tubes of a sufficient value to overcome the cathode or cut-off bias and thus ignite the tube. A flow of current through either one of the two gas tubes 26, 27 will operate relay 38 and produce an alarm.

In the operation of the alarm system, the switch 24 is first opened to disconnect the anodes of the gas tubes from the positive polarizing potential. The incoming or unknown wave and the locally produced wave are balanced out. Then the switch 24 is closed. The alarm 46 will be set off when one of the gas tubes ignites. Since the grid of a thyratron loses control over the anode current after the gas tube is conducting, the relay 38 will remain in its alarm position until an attendant opens switch 24. This action interrupts the flow of anode current through the gas tubes and de-energizes relay 38.

In order to provide an indication of the direction of an unbalance between the two complex waves, an inherent characteristic of the thyratrons has been employed. When the gas tube is ignited, its grid endeavors to assume a potential somewhere betweeen the potentials of its cathode and anode. Consequently, since the impedance of the deflection circuit is high, the conducting thyratron's grid changes the direct current level of the particular deflection plate to which it is connected. This action changes the centering of the oscilloscope in the direction of the original unbalance between the two complex waves. The shift in oscilloscope centering, like the relay closure, remains until an attendant opens switch 24.

The operation of the invention as a whole will now be given without any particular reference to the source of unknown waves. It is assumed that an unknown wave of repetition frequency equal to the fundamental frequency of the complex wave generator is available in current or voltage form and that it is desired to automatically excite an alarm system when changes occur in the unknown wave. The known wave from the commutator assembly (generator 10) and the unknown wave from lead 61 are combined in phase opposition at the mixer 12. A monitor oscilloscope 15 at the mixer output then provides a sensitive measurement of the degree of approximation obtained after the potentiometers P1–P40 and their combined shunt capacitance have been properly set. A visual illustration of the operation is best obtained on the oscilloscope 15. For example, with no local or known wave from generator 10, the unknown wave only will be shown on the screen of the oscilloscope. As potentiometers P1 to P40 are progressively adjusted, the unknown wave is sliced away (progressively cancelled out) until only a small noise residual remains. Now, if we draw a hypothetical line just above the noise, this line corresponds to the alarm threshold. If a change occurs in the unknown wave, regardless of polarity, the mixer output will increase in direct correspondence. The manual setting of the alarm threshold determines the amount of change required to operate the alarm. The alarm threshold can be established by suitably biasing the gas tubes below cut-off so as to render ineffective the mixer output noise residual insofar as the gas tube anode current is concerned. As an alternative, we might consider the average value of the noise to be the alarm threshold and then displace the noise downward. In either case, the effect is the same.

The electrical cancellation and indicating system of the invention is shown applied to a scanning receiver in the system of Figs. 4 and 4a, given by way of example only. The sawtooth circuit (condenser 17, etc.,) provides a saw-tooth wave of the same fundamental frequency (repetition rate) as the local wave, and this saw-tooth wave is used to sweep the heterodyne oscillator frequency of the scanning receiver. The output of this receiver is cancelled out in the same manner as described above. Actually, if the scanning receiver sweeps over a relatively wide spectrum with respect to its intermediate frequency band, the receiver output consists of short pulses, each corresponding to a received radio frequency carrier. These short pulses in the output of the scanning receiver and applied to the mixer may require only a few signal segments from the local generator to displace them below the alarm threshold.

The operation of the system of the invention as applied to a scanning receiver is shown graphically in Fig. 6, wherein graphs $r$, $s$, $t$, and $v$ illustrate different traces which might appear on the oscilloscope screen. Graph $r$ illustrates the pulses from the receiver output corresponding to signals from different known transmitters in the radio frequency spectrum being scanned. The pulses of graph $r$ appear on the oscilloscope with no local or known wave applied to the mixer. Graph $s$ is shown dotted and represents additional pulses in the output of the scanning receiver corresponding to signals suddenly appearing from unknown transmitters in the radio frequency spectrum being scanned. Graph $t$ illustrates rectangular wave pulses generated by the complex wave generator at such locations on the sweep trace and of such polarity as to neutralize or balance out the effect of the received pulses shown in graph $r$. These rectangular wave pulses are produced by adjusting only those potentiometers which are associated with those segments on the commutator producing the voltages to oppose or approximate the form of the incoming pulses. Thus, potentiometers P5 and P6 are adjusted to the same point to produce a rectangular pulse of polarity opposite to but equal in magnitude to the first pulse on graph $r$ received from a known transmitter. Potentiometers P13 and P14 are adjusted to form another single rectangular pulse. Potentiometers P21 and P22 are adjusted to form a third rectangular pulse. Potentiometer P32, however, is used alone to form still a fourth rectangular pulse. The other potentiometers, however, such as P1 to P4, P7 to P12, P15 to P20, P23 to P31, etc. are adjusted to provide no voltages on their associated segments, as the brushes on the commutator rotate. The successive numbers and the position of the segment units of the local wave generator relative to the sweep trace on the oscilloscope are shown on the bottom of Fig. 6 and given reference numerals 1 to 40, inclusive. These same numbers can be made to appear across the width of the fluorescent screen by placing a strip of material across the face of the screen on which the numbers appear. The solid lines of graph $v$ show the resultant wave from the mixer as seen on the screen of the oscilloscope. The horizontal dash and dot line of graph $v$ represents the alarm threshold or alarm operating position. An unknown signal arising above the alarm operating potential (as shown by the two dash line pulses $x$ and $y$) will operate the alarm.

Fig. 7 graphically shows three traces which might appear on the screen of the oscilloscope in attempting to balance out or approximate an unknown wave. Graph U represents a signal pulse from the output of a scanning receiver. Graph R represents a built up or step-by-step approximation of a wave form from the complex wave generator, while graph Z represents the resultant sum of the waves of graphs U and R as summed by the mixer and applied to the oscilloscope.

One advantage of this method is that "on" and "off" keying of known carriers does not interfere with the normal cancellation principle. This is evident since proper adjustment of the alarm threshold when the unknown carrier is on will merely leave a downward displacement in the line when the unknown carrier goes off. In the same way, fading of the known signal does not actuate the alarm. A further advantage of this method is that no portion of the received frequency spectrum is "blocked" off. For example, if a known carrier is displaced downward and an unknown carrier of the same frequency starts up, the two will beat together giving a received signal of maximum amplitude equal to the sum of the two signals. This peak amplitude will exceed the alarm threshold, in the practical case, so long as the amplitude of the second received carrier is greater than the upward displacement of the alarm threshold with respect to the normal horizontal axis.

It is thus seen that the cancellation and indicating system when used in conjunction with a scanning adapter or when constructed as in integral part of a scanning receiver, provides completely automatic operation after the existing known signals have been cancelled out. One might therefore expect that several such receiver systems could be monitored by one observer without severe optical strain since he would use the oscilloscope only during the initial setting up procedure and during those times when the alarm indicated the appearance of a foreign signal.

The various elements of the invention have other uses than those described above. For example, the complex wave generator can duplicate any wave shape of fixed repetition period. It is, therefore, an ideal coding signal generator. In a practical application, the forty amplitude control potentiometers might be ten-step voltage dividers numbered 1 to 10. The code designation for a particular wave would then consist of forty consecutive numbers indicating the individual settings of the forty voltage dividers. The total number of possible combinations, i.e., the variety of coding waves available, is given by the relation $$C_n = \frac{\lfloor 400}{\lfloor 10 \; \lfloor 390}$$

or approximately $C_n \doteq 10^{14}$.

These combinations can be further complicated by adding various shunting capacitances across the output of the complex wave generator.

Figure 8:
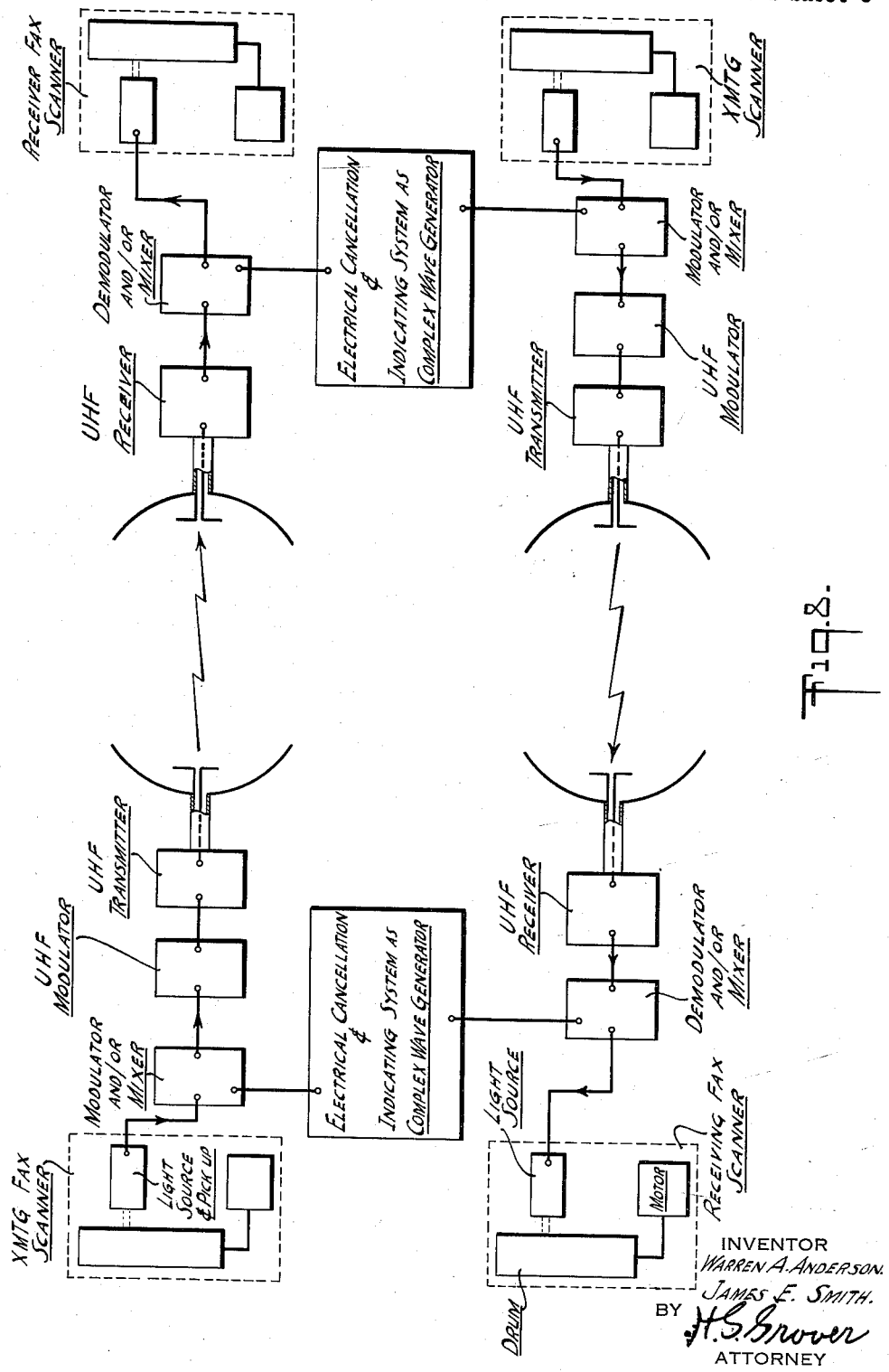
Fig. 8 illustrates by way of example only, the principles of the invention applied as a coding signal generator to a radio communication system.

A practical adaptation of this coding device for two-way operation is indicated in Fig. 8. For example, let $F_c(t)$ be the coding wave and $F_s(t)$ be the signal intelligence to be transmitted. These waves may be scrambled in any desired manner in their common mixer circuit. If we assume the mixer functions as a mathematical multiplier, the coded wave will be $F_c(t) \times F_s(t)$. This wave arrives at the receiver where an identical coding generator has its output inverted and multiplied into the incoming wave giving $$F_c(t) \times F_s(t) \times \frac{1}{F_c(t)} = F_s(t)$$

It will be understood that the complex wave generators at each end must be running in time and phase synchronism. The reverse transmission operates in exactly the same manner. However, if the coding wave at the original transmission point is to be satisfactory for decoding as well, it cannot lead the incoming scrambled signal by more than a few degrees. This means the transmission time around the radio loop must be small compared to the period of the coding wave. The arrangement of Fig. 8 would therefore be useful for short distance circuits only. Long distance two-way operation could utilize an additional segmented ring and brush arm on the transmitting commutator. Proper phase adjustment could then be obtained by angular displacement of the brush arm.

The complex wave generator finds application in electrical network analysis, and this may be done by incorporating in one unit a complex wave generator, two oscilloscopes and an assortment of ladder networks. The wave generator can furnish a large variety of wave forms to the inputs of the several networks and be observed on one of the oscilloscopes. Similarly, the output response of the networks can be studied individually on the second oscilloscope by appropriate switching. Thus, when a problem of network analysis involves a complicated mathematical solution, the use of the complex wave generator simplifies the solution. The complex wave generator can thus be used not only to verify existing mathematical solutions of network problems, but also to derive approximate responses of very complex networks for which no exact solutions have as yet been obtained.

The invention also finds use in multiplex station monitoring. For example, if it is desired to monitor the frequency of several radio transmitters simultaneously, we could use the invention as applied to a panoramic receiver. If the frequency of one carrier being monitored varied, it would be displaced on the time axis of the oscilloscope and rise out of its declivity, thus ringing the alarm. If, on the other hand, it is desired to monitor the transmissions (as distinguished from frequency) of several transmitters simultaneously, one might have a plurality of receivers with their outputs connected to individual segments of a commutator. The rotating brush arm would then serve as a scanner with its output connected to a page type facsimile recorder. By synchronizing the drum speed of the recorder with the rotation of the brush arm, each transmitter signal would be recorded as a horizontal track similar to variable density movie records.

We also contemplate the use of an electronic complex wave generator for electrically cancelling received pulses. Such an electronic generator would be used at high frequencies and would produce a series of closely adjacent direct current pulses each of, let us say, one microsecond duration, approximately. This can be achieved by a multiplicity of adjustable electronic vacuum tube trigger circuits suitably synchronized and arranged in a ring circuit so that each trigger sets off the next one. These triggers each may comprise a pair of electrode structures having grid and anode electrodes so interconnected that the trigger is self-restoring; that is, it has only one stable state or degree of equilibrium. When using such an electronic complex wave generator to cancel a short pulse, of say two microseconds, received on a radio locator (radar) system, it may be necessary to use only two adjacent triggers of the generator to produce a wave form of duration equal to the two microsecond radar pulse.

What is claimed is:

1. The method of electrically cancelling a recurrent complex wave which comprises generating a composite wave by producing a series of pulses of fixed duration which follow one another in such close succession that the start time of any one pulse succeeding the first pulse coincides with the back end of the preceding pulse, adjusting the amplitudes of the said series of pulses to produce a composite wave which duplicates to a certain approximation the wave form of the recurrent complex wave, synchronizing the recurring rates of said two waves, and mixing the two waves in such relative polarities that the complex wave is substantially completely cancelled by said composite wave.

2. The method of electrically cancelling a recurrent complex wave which comprises generating a composite wave by producing a series of pulses of fixed duration which follow one another in such close succession that the start time of any one pulse succeeding the first pulse coincides with the back end of the preceding pulse, adjusting the amplitudes of the said series of pulses to produce a composite wave which duplicates to a certain approximation the wave form of the recurrent complex wave, synchronizing the recurring rates of said two waves, mixing the two waves in such relative polarities that the complex wave is substantially completely cancelled by said composite wave, and producing an alarm indication when new wave components appear in said recurrent complex wave exceeding a predetermined threshold value.

3. In combination, a complex wave generator comprising first, second, third and fourth concentric rings, said first ring being divided into a multiplicity of closely adjacent and equal length segments which are insulated from each other, a potentiometer for each of said segments except at least one, a source of unidirectional potential connected between the terminals of all the potentiometers, an adjustable tap connecting each potentiometer to its associated segment, said second ring being continuous for substantially its entire circular length and having an insulated segment on the same radial line as said one segment of said first ring, said third and fourth rings being continuous throughout, brushes for each of said rings, connections between the brushes of said first and third rings and between the brushes of said second and fourth rings, respectively, said brushes being arranged in substantially a straight line, a motor for producing relative motion between said brushes and rings at a low audio frequency rate, a connection from said fourth ring to ground, an electronic wave mixer having a pair of input terminals, a connection from one of said input terminals to said third ring, a connection from the other input terminal to a source of repetitive waves, a saw-tooth generator having a condenser and means for linearly charging said condenser, and a connection from said condenser to said one segment of said second ring, to thereby discharge said condenser periodically, and circuit means for synchronizing the rate of occurrence of said repetitive waves with the frequency of the wave produced by said complex wave generator.

4. In combination, a complex wave generator comprising first, second, third and fourth concentric rings, said first ring being divided into a multiplicity of closely adjacent and equal length segments which are insulated from each other, a potentiometer for each of said segments except at least one, a source of unidirectional potential connected between the terminals of all the potentiometers, an adjustable tap connecting each potentiometer to its associated segment, said second ring being continuous for substantially its entire circular length and having an insulated segment on the same radial line as said one segment of said first ring, said third and fourth rings being continuous throughout, brushes for each of said rings, connections between the brushes of said first and third rings and between the brushes of said second and fourth rings, respectively, said brushes being arranged in substantially a straight line, a motor for producing relative motion between said brushes and rings at a low audio frequency rate, a connection from said fourth ring to ground, an electronic wave mixer having a pair of input terminals, a connection from one of said input terminals to said third ring, a connection from the other input terminal to a source of repetitive waves, a saw-tooth generator having a condenser and means for linearly charging said condenser, and a connection from said condenser to said one segment of said second ring to thereby discharge said condenser periodically, and a connection from said saw-tooth generator to said source of repetitive waves to synchronize the repetition rate of said source with the repetition rate of the complex wave produced by said complex wave generator.

5. A system in accordance with claim 3, including an oscilloscope having a pair of horizontal deflection plates and a pair of vertical deflection plates, an amplifier circuit coupling said horizontal deflection plates to said saw-tooth generator, and another amplifier coupling said vertical deflection plates to the output of said electronic wave mixer.

6. A system in accordance with claim 3, including an oscilloscope having a pair of horizontal deflection plates and a pair of vertical deflection plates, an amplifier circuit coupling said horizontal deflection plates to said saw-tooth generator, another amplifier coupling said vertical deflection plates to the output of said electronic wave mixer, and an alarm device coupled to said vertical deflection plates to indicate a change in the source of repetitive waves exceeding a predetermined threshold value.

7. The method of electrically cancelling a repetitive wave which comprises producing a repetitive complex wave composed of a series of equal duration rectangular wave pulses of adjustable amplitude and so phased that any one pulse succeeding the first pulse can be made to have its start time coincide with the back end of the preceding pulse, mixing said two waves, and progressively cancelling said first wave by sucessively adjusting the amplitudes of the pulses of said complex wave until the repetitive wave is completely cancelled.

References Cited in the file of this patent
UNITED STATES PATENTS

| | | |
|---|---|---|
| 1,811,102 | Adams et al. | June 25, 1931 |
| 1,858,037 | Burton | May 10, 1932 |
| 1,959,388 | Shiokawa | May 22, 1934 |
| 1,990,023 | Eremeeff | Feb. 5, 1935 |
| 2,041,245 | Haffcke | May 19, 1936 |
| 2,132,205 | Dickieson | Oct. 4, 1938 |
| 2,136,621 | King | Nov. 15, 1938 |
| 2,147,756 | Luck | Feb. 21, 1939 |
| 2,226,706 | Cawein | Dec. 31, 1940 |
| 2,286,170 | Heiland | June 9, 1942 |
| 2,312,203 | Wallace | Feb. 23, 1943 |
| 2,313,209 | Valensi | Mar. 9, 1943 |
| 2,340,002 | McKelley et al. | Jan. 25, 1944 |
| 2,409,012 | Bliss | Oct. 8, 1946 |

FOREIGN PATENTS

| | | |
|---|---|---|
| 837,587 | France | Nov. 12, 1938 |
| 543,117 | Great Britain | Feb. 11, 1942 |